INVENTOR.
Albert N. Cramer

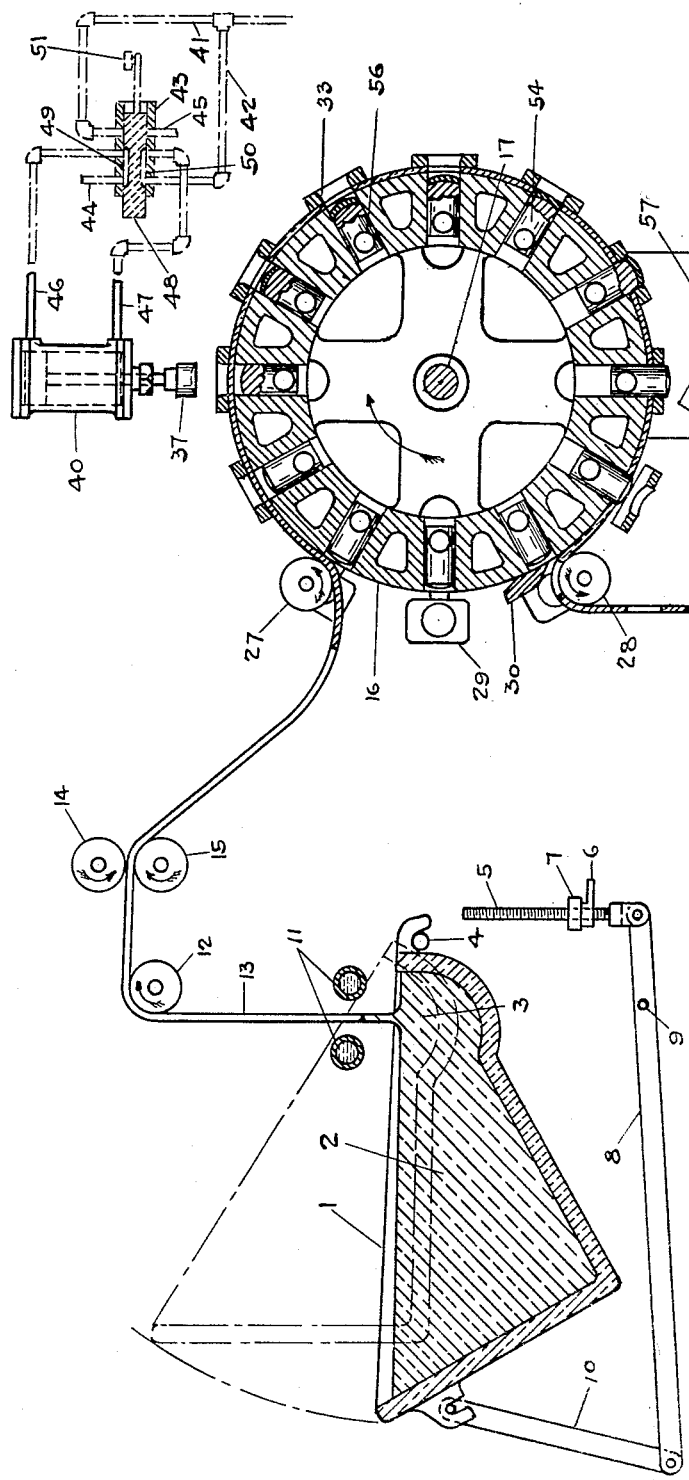

Patented Dec. 10, 1935

2,023,781

UNITED STATES PATENT OFFICE 2,023,781

MACHINE FOR FORMING GLASS LENS BLANKS

Albert N. Cramer, Toledo, Ohio, assignor to Alice B. Cramer, Toledo, Ohio

Application September 28, 1931, Serial No. 565,564

24 Claims. (Cl. 49—1)

The present invention relates to improvements in machines for forming lens blanks, such as are used particularly for manufacture of glass spectacle lenses. It relates particularly to forming the molten glass into suitable shapes from which the finished lenses may be ground.

It is customary to roll the molten glass into flat sheets, and each sheet, when cooled, is subdivided by cutting into square portions of suitable size to form the lens blank. Such cutting is usually done by scratching the surface of the sheet and breaking through such scratch, which produces rough fractured edges. These square portions are sorted by weight and re-heated to proper plasticity to mold into round forms with curved surfaces, from which the finished lenses are ground. The re-heating operation is always difficult and precarious. Some glasses are very sensitive to the furnace atmosphere, and great caution must be exercised that a definite atmosphere is maintained. Other glasses invariably change color in the re-heating process, and a slight variation of the temperature will vary the resultant color of such glasses. Many finished lenses are defective because the rough edges do not fuse during the re-heating and molding operations. Furthermore, the difficulty of accurately weighing each lens forming portion results in lens blanks of various thicknesses, which seriously complicates the grinding operation, particularly when it is done in groups.

It has been attempted to make spectacle lens blanks by using a gob feeder for subdividing the molten glass and pressing a multiple of lens blanks from each gob, in a manner similar to the usual gob fed pressing operation. The result has been unsatisfactory because striae has developed which makes the blanks unfit for spectacle lenses. It is characteristic of the strip drawing process that the minimum amount of striae is developed in such strip and what striae may develop will be in the direction of the draw. Such striae will be parallel to the surfaces of lens blanks punched from such strips and would not be objectionable in spectacle lens blanks.

One object of the present invention is to provide lens blanks with the minimum amount of striae and to control any striae that may develop so that it is parallel to the surfaces of the finished lenses.

Another object relates to forming lens blanks directly from the molten glass which has been allowed to cool to the plastic state.

Another object is to provide lens blanks which have been formed directly from the molten glass that has been allowed to cool to the plastic state, and which are devoid of fractured edges.

Another object is to provide means for forming lens blank portions from a mass of molten glass by drawing a strip of plastic glass from the molten mass, and punching lens blank portions from the strip while it is still in a plastic state.

Another object is to provide means for forming lens blanks from a mass of molten glass by drawing a strip of plastic glass from the molten glass, punching lens blank portions from the strip while in the plastic state, and forming lens blanks from such portions while still in the plastic state.

Another object is to provide a receptacle for molten glass which is constructed so that the glass may be maintained in that portion of the receptacle from which a strip of plastic glass is being drawn, and while the mass of molten glass is being reduced.

Another object is to provide a receptacle for molten glass which is so constructed that the glass may be maintained in the portion of the receptacle from which a strip of plastic glass is being drawn in an upward direction and while the mass of molten glass is being diminished in the remainder of the receptacle.

Other objects will be apparent hereinafter.

In the accompanying drawings:

Figure 1 is a sectional view in elevation of the proposed mechanism.

Figure 2 is a detail in section, showing particularly the clamping device for gripping the strip of plastic glass.

Figure 3 is a detail in section of the clamping device shown in Figure 2 positioned to permit feeding the strip of plastic glass to the periphery of the drum.

Figure 4 is a detail in section showing the die-bottom used for forming one surface of the lens blank.

Figure 5:
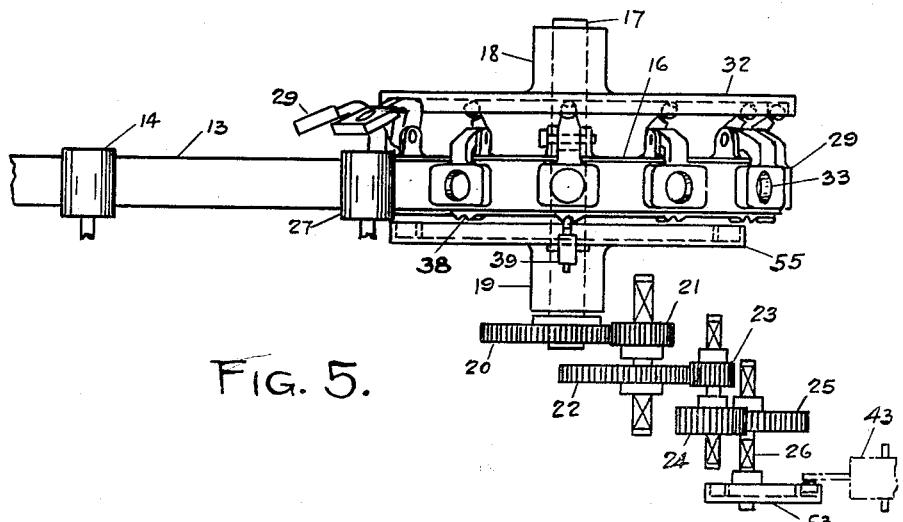
Figure 5 is a plan view of the mechanism shown in Figure 1.
Figures 6, 7:
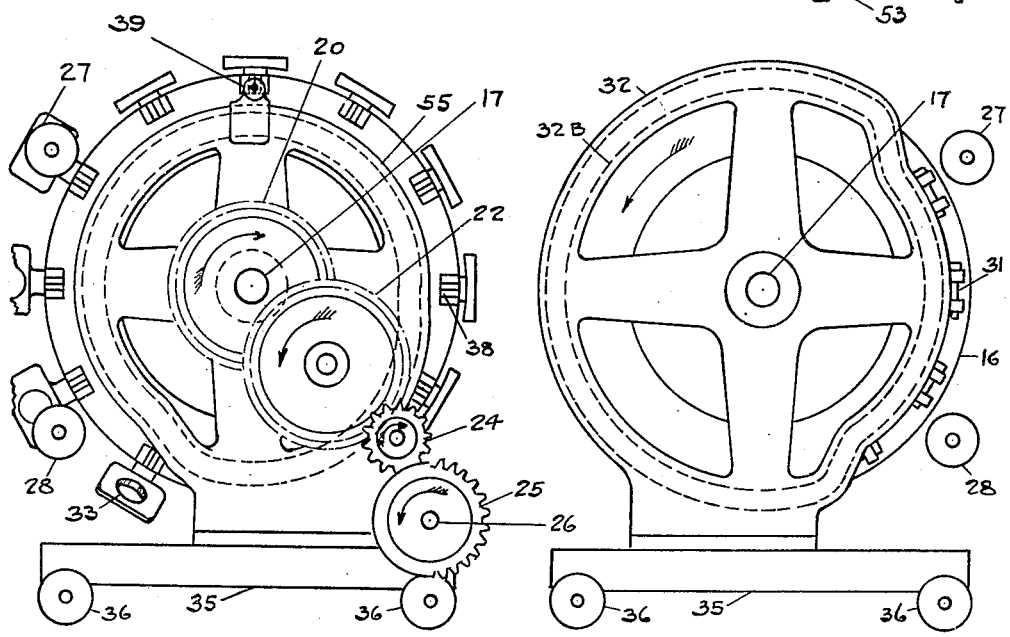
Figure 6 is a side elevation view of the mechanism shown in Figure 1, and shows in details the cam for operating the die-bottoms and the drive gearing.
Figure 7 is a view in elevation of the opposite side of the mechanism shown in Figure 6, and shows particularly the cam for operating the clamping devices.

In the accompanying drawings is shown a receptacle 1, with molten glass 2 therein, which is heated, in a manner not shown, to maintain any desired temperature. As shown in Figure 1, said receptacle is provided with a gathering portion 3, from which a strip of plastic glass may be drawn in any usual manner. Adjacent the gathering portion is a pivot 4, about which the receptacle may be tilted. Threaded member 5 is provided with a nut 6 co-acting with the stop 7, and is connected to the lever 8, which is fulcrumed at 9, and which supports the rear end of the receptacle by means of the link 10. Adjustment of the nut 6 is adapted to tilt the receptacle and cause the molten glass to flow to the gathering portion of the receptacle, to replace the molten glass that has been used to form the strip drawn therefrom.

Water coolers 11, such as are commonly used in drawing strip glass, are adjustably positioned above the gathering portion of the receptacle and regulate the thickness of the strip being drawn. The roller 12 is positioned above the coolers and is adapted to receive the strip of plastic glass 13 and divert it from the verticle drawing position to a horizontal plane. Drawing rollers 14 and 15 are driven, by any suitable source of power not shown, and draw the plastic strip of glass, under tension induced by the upward drawing operation, at any predetermined speed to insure the desired thickness of such strip. The speed of travel of the periphery of these drawing rollers is timed with the speed of the strip carrying drum 16, in a manner which will be described later.

The punching device, for punching lens blanks from the strip of plastic glass, is positioned in spaced relation with the rollers 14 and 15. It comprises a drum 16, secured to the axle 17, which is mounted in suitable bearings 18 and 19. The gear 20 is mounted on the axle 17, and is driven by a suitable train of gears 21, 22 and 23, which are actuated by the interrupted toothed gear 24, which is driven by its complemental interrupted toothed gear 25. Gear 25 is secured to the continuously rotating shaft 26, which is driven by any suitable source of power, not shown. The speed of rotation of this shaft 26 is in timed relation with the drawing rollers 14 and 15. The strip of plastic glass 13 on the periphery of the drum 16 has interrupted movement due to the interrupted gears 24 and 25; whereas, the drawing rollers 14 and 15 have continuous movement. The strip of glass is under tension of the drawing operation until it reaches the drawing rollers 14 and 15; but when it leaves the rollers 14 and 15 the drawing operation is completed and the drawing tension is relieved and the strip sags in its passage to a position beneath the guide roller 27, which guides it to the drum 16. The speed of the drum is so timed that each movement thereof moves the strip of glass on its periphery the exact amount of the travel of the strip through the drawing rollers during the complete interval of time required for each moving and rest period of the drum. During the period of non-rotation of the drum, the strip of glass will accumulate and sag in the space between the drawing rollers and the drum; whereas, during the period of time that the drum is rotated the accumulation is used and the strip assumes normal position.

The guide roller 27 is positioned and adapted to guide the strip of plastic glass to the periphery of the drum 16, while the gripping devices 29 are held in normal position, as shown in Figure 3. The guide roller 28 is adapted to retain the now perforated strip of glass to the periphery of the drum until the stripper 30 is reached. This stripper is so positioned that it clears the passing surface of the drum of all glass particles.

Attached to the drum 16, for gripping the strip of plastic glass 13 and securing it to the surface thereof, is a series of spaced devices 29, hinged at 31 and actuated by the fixed cam 32, by means of the cam roller 32A, which is guided in the cam-path 32B. Normally these gripping devices are held away from engagement with the periphery of the drum, as shown in Figure 3. When the strip of glass has passed the guide roller 27 and contacts with the drum 16, the devices are actuated by the cam 32 to clamp the strip to the drum, as shown in Figure 2. When the lens blank has been formed, continued rotation of the drum carries the gripping device to that position on the cam 32 where the devices disengage from the strip. Each gripping device 29 is constructed with an opening 33, substantially the size of the punchings required for the lens blanks, and this opening aligns with the opening 34 in the periphery of the drum, when the gripping devices are in gripping position, as shown in Figure 2.

The cam 32 supports the bearing 18 for the axle 17, and is rigidly secured to the base 35 of the punching device. The base is mounted on the wheels 36 to facilitate moving the punching device into suitable spaced relation with the receptacle 1 for the molten glass.

Positioned above and upon a radial of said drum 16 is the punching die 37, suitably positioned to match with the openings 34 in the periphery of the drum. Spaced notches 38 on the side of the drum are constructed to be engaged by a spring detent 39, which is mounted on the fixed cam 55, to be described later. This detent acts as a locking device and insures proper alignment of the punching die and the openings in the drum and gripping device.

Figure 8:
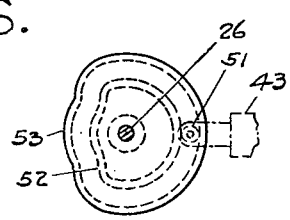
Figure 8 is a detail view in elevation of the cam used to operate the air control valve of the punching and forming device.

The punch 37 is actuated by the motor 40, by means of fluid pressure supplied through the pipes 41 and 42, from any suitable source of supply. The valve 43 is interposed in these lines, and is constructed with exhaust ports 44 and 45, and pipe lines 46 and 47 which lead to opposite ends of the motor 40. The valve 43 is provided with a slidable piston 48, which contains ports 49 and 50. The slidable piston 48 is controlled by the cam roller 51, which is guided in the cam-path 52 of the cam 53, as shown in Figures 5 and 8. In the position shown diagrammatically in Figure 1, the upper end of the motor 40 is connected through the pipe 46, port 49 and exhaust port 44 to the atmosphere; whereas, the lower end of the motor is connected by the pipe 47, port 50 and pipe 42 to the source of supply of the fluid pressure. This holds the punching die in nonoperative position as shown in Figure 1. When the cam 53 has rotated sufficiently, it moves the piston 48 to the other end of the valve 43, and the ports 49 and 50 are moved to close the openings 42 and 44, and to connect the openings 41 and 45 with the motor. In such position the upper end of the motor is connected by the pipe 46, port 49 and pipe 41 to the source of supply of the fluid pressure; whereas, the lower end of the motor is connected by the pipe 47, port 50 and exhaust port 45 to the atmosphere. Thus the punching die 37 is forced down through the strip of glass and removes a measured portion of such strip. Continued movement of the punching die will press this measured portion of plastic glass on the die-bottom 54, which co-acts with the sides of the opening 34 to shape it into a lens blank. The cam 53, which is secured to the continuously rotating shaft 26, now moves the valve piston to the position first described and causes the punching die 37 to be withdrawn from the opening 34 of the drum. The cam 53 is positioned on the shaft 26 in such relation to the interrupted toothed gear 25 that the punching operation is completed while the drum is at rest. When each punching operation is completed the drum is rotated, by the interrupted toothed gears, to the next succeeding station, and locked by the detent 39 while the next succeeding punching operation is performed. The gripping devices 29 are constructed to clamp the strip of plastic glass, which is adjacent the opening 34, from being drawn into such opening during the punching operation. This clamping action assures that each punching will be of predetermined size.

In many cases it may be advisable to form the glass punchings into predetermined shapes. The openings 34, of the drum 16, are provided with movable die-bottoms 54. The die-bottom 54, co-acts with the sides of the opening 34 and with the bottom surface of the punching die 37, to form a complete mold to definitely shape the glass while it is still plastic. Suitable curved surfaces may be provided on the punching die and the die-bottom to form a lens blank of any desired focus, or prism. The punching, now completely formed in the die mold as previously described, rests on the die-bottom while the punching die is being withdrawn from the opening 34, and it is retained there until the glass has cooled sufficiently to properly "set" the lens blank. As the drum is rotated the die-bottom is gradually inverted, and the cam 55, co-acting with the roller 56 attached to the die-bottom 54, forces the die-bottom from the opening 34 and through the perforated strip 13. The lens blank is now discharged from the die-bottom, as shown in Figure 1. The continued rotation of the drum causes the cam 55 to re-draw the die-bottom into the opening 34; and such movement must be completed prior to the release of the gripping devices as previously described.

The cam 55 supports the bearing 19 of the axle 17, and is rigidly secured to the previously described base 35 of the punching device.

After the die-bottom has been withdrawn into the opening 34, continued rotation of the drum carries the gripping device 29 to that position on the cam 32 which causes it to release the strip of perforated glass and assume normal position, as shown in Figure 3. Further rotation of the drum carries the strip of perforated glass past the guide roller 28 to the stripper 30, which is positioned to contact with the periphery of the drum and thereby insure complete removal of the perforated strip therefrom.

The lens blanks are delivered from the die-bottoms to a chute 57, as shown in Figure 1, and thence to any suitable receptacle, not shown, for handling to the annealing process.

The perforated strip of glass need not be wasted, as, with proper care, it may be re-melted and re-worked.

Modifications may be resorted to within the scope and spirit of this invention.

What I claim is:

1. In a glass forming machine, a container with molten glass thereon, means for drawing a strip of plastic glass continuously at a predetermined speed from said molten glass, a carrier for said strip rotatable vertically, and a punch co-acting with said carrier.

2. In a glass forming machine, a container with molten glass therein, means for drawing a strip of plastic glass of uniform thickness at a predetermined speed from said molten glass, a carrier for said strip having an interrupted movement, and a punch co-acting with said carrier while said carrier is at rest, said carrier constructed and arranged to maintain the uniform thickness of said strip.

3. In a glass lens forming machine, a container with molten glass therein, means for drawing a strip of plastic glass of uniform thickness at a predetermined speed from said molten glass, a carrier for said strip having interrupted movement and constructed and arranged to maintain the uniform thickness of said strip, a punch co-acting with said carrier and adapted to punch lens forming portions from said strip, and means for shaping said lens forming portions while the glass is plastic.

4. In a glass lens forming machine, a container with molten glass therein, means for drawing a strip of plastic glass of uniform thickness at a predetermined speed from said molten glass, and a carrier for said strip having moving and rest periods, the speed of said carrier being so timed that the movement of said carrier during each moving perior is equal to the travel of the strip during the interval of time required for a complete moving and rest period of said carrier, said carrier constructed and arranged to maintain the uniform thickness of said strip.

5. In a glass lens forming machine, a container with molten glass therein, means for drawing a strip of plastic glass continuously from said molten glass, an annular member adapted to carry said strip, and means for clamping said strip to the periphery of said annular member.

6. In a glass lens forming machine, a container with molten glass therein, means for drawing a strip of plastic glass from said molten glass, an annular member adapted to carry said strip, means for rotating said annular member, and clamps adapted to hold said strip to said annular member during a predetermined period of the rotation thereof.

7. In a glass lens forming machine, a container with molten glass therein, means for drawing a strip of plastic glass from said molten glass, an annular member adapted to carry said strip, spaced openings in the periphery of said annular member, clamps adapted to hold said strip to the periphery of said annular member, openings in said clamps adapted to register with the said spaced openings, a plunger adapted to register with the openings in said clamps, and means to actuate said plunger.

8. In a glass lens forming machine, a container with molten glass therein, means for drawing a strip of plastic glass of uniform thickness from said molten glass, a member adapted to carry said strip, constructed and arranged to maintain the uniform thickness of said strip, means for interruptedly moving said member, spaced openings in said member, a plunger positioned to register with successive said spaced openings, and means for actuating said plunger.

9. In a glass lens forming machine, a container with molten glass therein, means for drawing a strip of plastic glass from said molten glass, a member adapted to carry said strip, means for moving said member, clamps for holding said strip to said member, openings in said member, and means for forcing measured portions of said strip into said openings.

10. In a glass lens forming machine, a container with molten glass therein, means for drawing a strip of plastic glass from said molten glass, a member adapted to carry said strip, means for moving said member, clamps for holding said strip to said member, openings in said member, a plunger adapted to register with said openings, means to actuate said plunger thereby severing measured portions of said strip, and means for forming said measured portions into lens blanks.

11. In a glass lens forming machine, a container with molten glass therein, means for drawing a strip of plastic glass from said molten glass, a carrier adapted to carry said strip, means for moving said carrier, means for clamping said strip to said carrier, a plurality of openings in said carrier, a plunger, means for moving said openings to successively register with said plunger means to actuate said plunger thereby severing measured portions from said strip, means for forming said measured portions into lens blanks, and means for discharging said lens blanks.

12. In a glass lens forming machine, a container with molten glass therein, means for forming a strip of plastic glass under tension, advancing the strip, and freeing it from tension as it advances beyond said means, a carrier for said plastic strip positioned beyond said means, the strip being free from tension in its passage from said means to said carrier, and means for fabricating a plurality of glass articles from said plastic strip.

13. In a glass lens forming machine, means for forming a strip of plastic glass, a carrier for said strip of plastic glass, clamping rings secured to said carrier for clamping said strip of plastic glass to said carrier, and means for fabricating a plurality of glass articles from portions of said strip of plastic glass surrounded by the clamping rings while the strip is clamped by said rings to said carrier.

14. In a glass lens forming machine, means for forming a strip of plastic glass, a carrier for said strip of plastic glass in spaced relation to said strip forming means, clamping rings secured to said carrier, means for operating said rings and causing them to clamp said strip of plastic glass to said carrier, and means for fabricating a plurality of glass articles from the portions of said plastic strip surrounded by the clamping rings.

15. The process of forming lens blanks, which comprises drawing a strip of plastic glass under tension from a mass of molten glass, relieving the strip from such drawing tension, and forming glass articles from said strip while it is plastic.

16. The process of forming lens blanks, which comprises drawing a strip of plastic glass under tension from a mass of molten glass, and relieving the strip from such drawing tension so that its movement may be interrupted while glass articles are being formed.

17. In a glass lens forming machine, a container with molten glass therein, means for forming a strip of plastic glass from said molten glass, a carrier for said strip, clamps hinged to said carrier, and means for moving said clamps into and out of clamping contact with said strip.

18. In a glass lens forming machine, means for forming a strip of plastic glass, a carrier for said strip, a plunger for forming glass articles from said strip, and a clamp with an opening therein through which said plunger operates, said clamp constructed to hold said strip to said carrier.

19. In a glass lens forming machine, means for forming a strip of plastic glass, a carrier for said strip, means for clamping said strip to said carrier, and means for forming glass articles from said strip, said clamping and forming means being independent mechanisms.

20. The process of forming glass articles which comprises, drawing a flat, ribbon-like strip of plastic glass upward through space from the surface of a pool of molten glass with the strip under tension, removing the tension from the plastic strip after the drawing operation, carrying the strip by interrupted movement to a fabricating device, maintaining the center line of the strip in a single vertical plane throughout said movements, and successively fabricating a plurality of glass articles from portions of the strip of predetermined size and shape and while the glass comprising said portions is still plastic.

21. The process of forming glass articles which comprises, drawing a flat, ribbon-like strip of plastic glass upward through space from the surface of a pool of molten glass, relieving the plastic strip from the drawing tension and moving it unsupported in an approximately horizontal direction while permitting it to sag after the drawing operation, advancing the strip by periodically interrupted movement to a fabricating device, and fabricating articles from portions of the strip of predetermined size and shape while the glass comprising said portions is still plastic.

22. The process of forming glass articles which comprises drawing a ribbon of plastic glass upward under tension from the surface of a pool of molten glass, relieving the ribbon of the drawing tension and causing it to advance in a plastic condition to a fabricating station, segregating predetermined areas of the strip and while the glass is still plastic, fabricating articles at said station from the glass within said areas, and maintaining the center line of the ribbon in a single vertical plane throughout its movement from the pool to the fabricating station.

23. In a glass lens forming machine, a container with molten glass therein, means for forming a strip of plastic glass from said molten glass, a member adapted to carry said strip, means for removing from said strip portions of predetermined size and shape and fabricating glass articles therefrom, and a clamping device constructed and arranged to surround said portions and clamp the strip to the said carrier member during the removal of said portions from the strip.

24. In a glass lens forming machine, a container with molten glass therein, means for forming a strip of plastic glass from said molten glass, a member adapted to carry said plastic strip, means for removing from said strip portions of predetermined size and shape and fabricating glass articles therefrom, and a clamping device constructed and arranged to surround said portions and clamp the strip to the said carrier member during the removal of said portions from the strip, said fabricating means and said clamping means being operable simultaneously.

ALBERT N. CRAMER.